Figure 1:
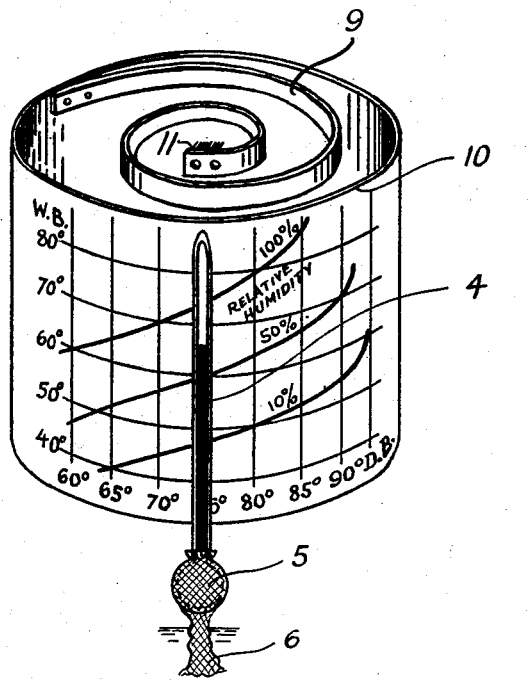

Oct. 21, 1952  R. M. BRAUN  2,614,428
PSYCHROMETER

Filed March 30, 1948  2 SHEETS—SHEET 1

Rudolf Max Braun
INVENTOR.

BY Ernest P. Irany
AGENT

Oct. 21, 1952 — R. M. BRAUN — 2,614,428
PSYCHROMETER
Filed March 30, 1948 — 2 SHEETS—SHEET 2

Rudolf Max Braun
INVENTOR.
BY Ernest P. Irany
AGENT

Patented Oct. 21, 1952

2,614,428

UNITED STATES PATENT OFFICE 2,614,428

PSYCHROMETER

Rudolf Max Braun, New York, N. Y.

Application March 30, 1948, Serial No. 17,840

1 Claim. (Cl. 73—338)

My invention relates to an instrument indicating temperature, humidity and other air conditions which is based on the principle of the "wet-bulb" and "dry-bulb" thermometers.

As known to the art at present, the application of this principle requires the taking of two temperature measurements, one by means of the so-called wet-bulb thermometer and the other by means of the so-called dry-bulb thermometer; the relative humidity or factor related thereto is then computed from these two temperature measurements with aid of mathematical formulas, tables, slide rules or diagrams.

It is one object of my invention to provide an instrument which indicates the air conditions referred to above by means of a single reading without necessity of further computation. Another object of my invention is an instrument which indicates these air conditions visually; and a further object, an instrument which can be used to operate controlling devices for air-conditioning apparatus.

According to my invention these objects are attained in an instrument which comprises one thermometer registering the "dry-bulb" temperature, another thermometer registering the "wet-bulb" temperature and a movably mounted chart; said chart being caused to move or to rotate by one of the thermometers while placed in juxtaposition with the other thermometer in such a manner that the indicating point of the latter, in co-ordination with the movement of the chart, determines a certain area or position in the chart where the computed relative humidity and/or other air conditions related therewith are inscribed or indicated by a family of curves. For the purpose of my invention it is of no consequence whether the dry-bulb or the wet-bulb thermometer is used to provide the motion of the chart or, alternatively, which one of the two thermometers is acting in juxtaposition with the chart.

The term thermometer in the sense of my invention comprises any device sensitive to, and capable of registering, temperature. The principle employed may be, for example, the absolute or differential expansion of a solid, liquid or gaseous body or a combination of such bodies, or temperature-induced variations in other physical properties such as, for example, electrical conductivity, elasticity or fluidity. It is understood that at least one of such thermometers employed in the instrument must be of a type and construction to render it capable of functioning as a wet-bulb thermometer, i. e., with its temperature-responsive element in contact with evaporating water; and it is further understood that at least one of the said thermometers must be of a type and construction to permit its temperature response to be translated into mechanical motion and thus to be transmitted to the movable or rotatable element bearing the chart.

The chart is a psychrometric diagram whose coordinates are in correspondence with, respectively, the movement of the supporting member bearing the diagram and the movement of the indicating point of the juxtaposed thermometer. It may be inscribed in various convenient ways showing, for example, lines of constant relative humidity, lines of comparable comfort (the so-called effective temperatures), comfort zones for heated and cooled rooms, dew points, etc., all such data being directly accessible by a single reading and without need of computation.

Figure 2:
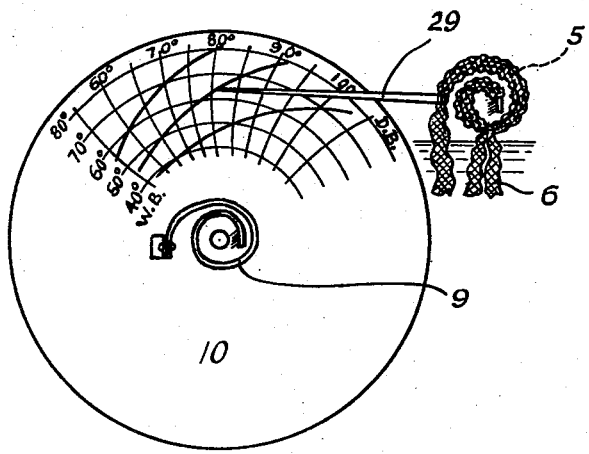
Figure 3:
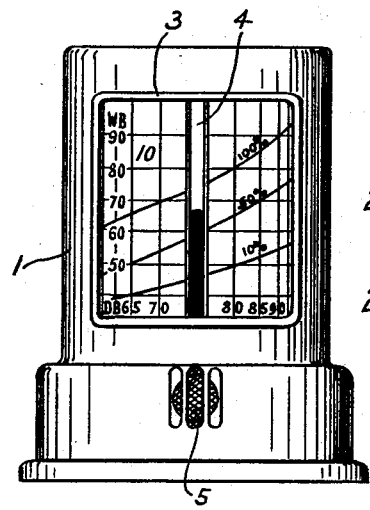
Figure 5:
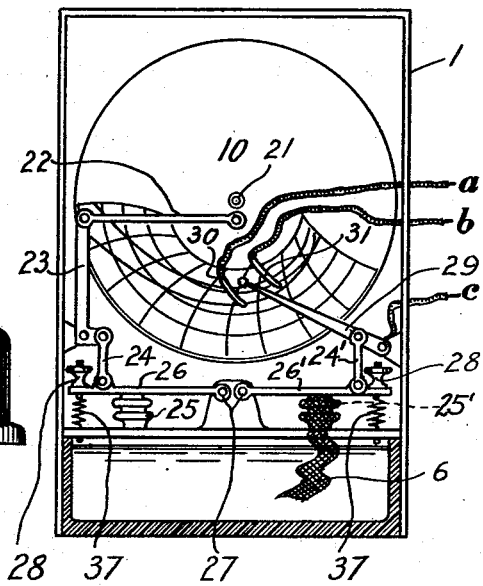
Figure 4:
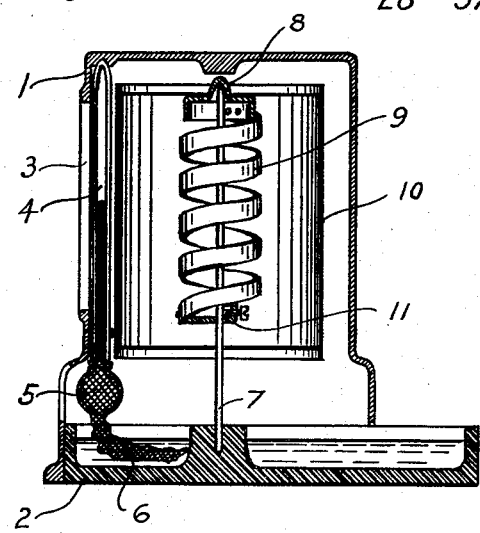

The invention will be further understood by reference to the accompanying drawings in which Fig. 1 and Fig. 2 illustrate the principle of the invention while Fig. 3 and Fig. 4 are a front view and sectional side elevation of one practical embodiment and Fig. 5 is a diagrammatic front view of another practical embodiment of the invention, by way of example.

As shown in Fig. 1, the psychrometric chart is printed on or attached to a drum 10 which is rotated by a bi-metallic strip 9. One end of the strip 9 is attached to the drum 10 and the other end is attached to a fixed support 11. A liquid-filled capillary thermometer with stem 4 is arranged in juxtaposition to the chart as shown. Its bulb 5 is kept in contact with evaporating water through the sock 6. As the ambient temperature changes the drum 10 follows the expansion or contraction of the bimetallic thermometer 9 by rotating around its axis into an angular position determined by the "dry-bulb" temperature which may be read alongside the stem 4 of the capillary thermometer. The end of the liquid column in the latter indicates the "wet-bulb" temperature and, by reference to the lines of constant relative humidity in the chart, shows the prevailing relative humidity without need of further computation or manipulation.

In Fig. 2 the chart is drawn on a plane circular disk 10 rotated around its center by a bimetallic strip 9 which acts as the "dry-bulb" thermometer. The "wet-bulb" thermometer is another bimetallic strip 5 covered by a wet sock 6 and moving a pointer 29 across the plane of the disk. In accordance with the circular movements of the chart 10 and the pointer 9 the "dry-bulb" and "wet-bulb" coordinates are curved.

In the embodiment shown in Figs. 3 and 4 a mercury or spirit thermometer 4, 5, 6 is employed as the "wet-bulb" thermometer and the bi-metallic helix 9 as the "dry-bulb" thermometer. A rectilinear psychrometer chart drawn to appropriate scale is printed on or attached to the surface of a cylindrical drum 10 rotating around its axis 7. The liquid-filled capillary of the "wet-bulb" thermometer 4 is placed in a fixed position in front of the drum 10 and parallel to its axis 7 so that the end point of the liquid column registers against the chart. The instrument is enclosed in a casing 1 attached to a base 2, both made of suitable materials such as metal, plastic or glass. The casing 2 has a window 3 which is covered by a curved sheet of glass or transparent plastic. Behind window 3 and in convenient view through it the "wet-bulb" thermometer 4, 5, 6 is attached to the casing 1. The sock 6 covering the bulb 5 extends into a cavity in the base 2 which is filled with water. The vertical pin 7, in co-axial position with the drum 10, is held rigidly by the base 2 at its lower end and its upper end is shaped to form a pivot for a cap 8. Rigidly connected with the cap 8 are the hollow cylindrical drum 10 and one end of the bi-metallic helix 9 whose other end is fastened to a bracket 11. The bracket 11 is rigidly but adjustably fixed on the pin 7 by means of a set screw. The instrument functions as illustrated in Fig. 1 and described in connection therewith. As shown in Fig. 3 it indicates a dry-bulb temperature of 75° F., a wet-bulb temperature of 67° F. and a relative humidity of 75%.

Fig. 5 shows another modification of the instrument in sectional side elevation. In this case two thermostatic bellows 25' and 25 are used as thermometers; 25', covered by a sock 6, acts as the "wet-bulb" thermometer and 25 as the "dry-bulb" thermometer. The disk-shaped chart carrier 10 is rotatingly pivoted at 21 and turned in its plane to a position indicative of the dry-bulb temperature by thermometer 25 through the means of the lever 26, the link 24, the bell-crank lever 23 and the link 22, the latter being rotatingly connected with an excentrically located point on the disk. The pointer 29 is operated by the "wet-bulb" thermometer 25' through the lever 26' and the link 24'. The two thermostatic bellows 25' and 25 are acting against the springs 37 through the levers 26' and 26 whose fulcrums are in fixed positions at 27. The tension in the springs 37 is individually adjustable by means of the nuts 28 engaging a threaded extension of the springs 37, thus providing means to calibrate the action of the bellows.

The instrument in the form shown in Fig. 5 can be used to operate air-conditioning apparatus by means of contact ledges 30 and 31 which may be attached to the disk 10 in any chosen position and by connecting these contact ledges as well as the pointer 29 with an electrical relay through the flexible wires a, b and c. In this manner it is possible to maintain certain desired air conditions such as, e. g., relative humidity, temperature, effective temperature, etc., within the limits set by the position of the contact ledges 30 and 31, the momentary conditions being visually indicated by the instrument at any time; it is also possible to produce a time record of maxima and minima of the controlled air conditions.

Auxiliary devices may be used in connection with the instrument or combined with its essential elements in a common housing. For example, means for supplying an extended water supply and for maintaining the water level constant may be provided; a small motor-driven fan may be used for ensuring adequate air flow over the wet bulb; other auxiliary devices for a variety of purposes are obvious to those skilled in the art.

It will be understood that, without departing from the spirit of the invention or the scope of the claims, various modifications may be made in the specific expedients described. The latter are illustrative only and not offered in a restrictive sense, it being desired that only such limitations shall be placed thereon as may be required by the state of the prior art.

I claim:

An instrument for indicating the humidity of air comprising, (a), a casing including a compartment holding water and having a window-like opening located above the said compartment; (b), a cylindrical drum rotating around its axis inside the said casing and rotatingly supported, with said axis in a vertical position, on the said casing, a bi-metallic temperature-responsive element having one terminal rigidly attached to the said casing and the other terminal operatively attached to the said cylindrical drum to rotate said drum to a position corresponding to the prevailing temperature, and a chart on the surface of said drum showing lines parallel to the axis of the drum indicating loci of equal dry air temperature, and lines of equal relative air humidity as determined by calibration of the fully assembled instrument under known atmospheric conditions; and, (c), a liquid-filled capillary thermometer rigidly mounted on the said casing in a vertical position in front of, and with its capillary tube extending across, the said window-like opening of the casing, with the liquid meniscus in said capillary thermometer tube being juxtaposed to, and readable against, the said chart, and a wick covering the bulb of the said liquid-filled capillary thermometer and drawing water from the water-holding compartment included in the said casing.

RUDOLF MAX BRAUN.

REFERENCES CITED

The following references are of record in the file of this patent:

UNITED STATES PATENTS

| Number | Name | Date |
|---|---|---|
| 202,276 | Lowe | Apr. 9, 1878 |
| 1,935,398 | Howry | Nov. 14, 1933 |
| 2,107,017 | Spilhaus | Feb. 1, 1938 |
| 2,177,630 | Alder | Oct. 31, 1939 |
| 2,265,767 | Alder | Dec. 9, 1941 |

FOREIGN PATENTS

| Number | Country | Date |
|---|---|---|
| 307,402 | Germany | Aug. 21, 1918 |